United States Patent
Lindblom et al.

(10) Patent No.: US 9,019,336 B2
(45) Date of Patent: Apr. 28, 2015

(54) MAKING CALLS USING AN ADDITIONAL TERMINAL

(71) Applicant: Microsoft Corporation, Redmond, WA (US)

(72) Inventors: Jonas Lindblom, Solna (SE); Teemu Suutari, Harjumaa (EE)

(73) Assignee: Skype, Dublin (IE)

( * ) Notice: Subject to any disclaimer, the term of this patent is extended or adjusted under 35 U.S.C. 154(b) by 62 days.

(21) Appl. No.: 13/710,041

(22) Filed: Dec. 10, 2012

(65) Prior Publication Data

US 2013/0169736 A1 Jul. 4, 2013

Related U.S. Application Data

(60) Provisional application No. 61/581,995, filed on Dec. 30, 2011.

(51) Int. Cl.
*H04N 7/14* (2006.01)
*H04M 1/253* (2006.01)
(Continued)

(52) U.S. Cl.
CPC ............. *H04N 7/141* (2013.01); *H04M 1/2535* (2013.01); *H04L 65/403* (2013.01); *H04M 3/568* (2013.01); *H04L 65/605* (2013.01); *H04L 65/80* (2013.01); *H04M 2203/5045* (2013.01)

(58) Field of Classification Search
CPC . H04L 65/403; H04L 65/602; H04L 65/1057; H04L 65/80; H04L 65/605; H04M 1/2535; H04M 3/568; H04M 3/56; H04M 2203/5045; H04N 7/14; H04N 7/141

USPC ............... 348/14.01–14.16; 370/260–261
See application file for complete search history.

(56) References Cited

U.S. PATENT DOCUMENTS 6,061,434 A  5/2000 Corbett
6,215,865 B1 4/2001 McCalmont
(Continued)

FOREIGN PATENT DOCUMENTS

CN  1893691  1/2007
CN  1956479  5/2007
(Continued)

OTHER PUBLICATIONS

"Non-Final Office Action", U.S. Appl. No. 12/290,232, Jan. 16, 2014, 21 pages.
(Continued)

*Primary Examiner* — Melur Ramakrishnaiah
(74) *Attorney, Agent, or Firm* — Sonia Cooper; Jim Ross; Micky Minhas (57) ABSTRACT

A first terminal is coupled to a wide-area packet-based network and installed with first client application. One or more second terminals are coupled to the first terminal via a local wireless link, and each installed with an instance of a lightweight sub-client having reduced functionality relative to the first client. The first client establishes a call with a remote, third terminal over the network, based on a user credential identifying the first client. Each second terminal generates an audio or video stream, and each sub-client transmits the respective stream to the first client over the local wireless link for use in the call. The first client switches between a second state in which the call uses the streams from the sub-clients and a first state in which the call uses a stream generated by the first terminal without the streams from the sub-clients.

20 Claims, 4 Drawing Sheets

(51) Int. Cl.
*H04L 29/06* (2006.01)
*H04M 3/56* (2006.01)

(56) References Cited

U.S. PATENT DOCUMENTS

| | | | |
|---|---|---|---|
| 6,243,129 B1 | 6/2001 | Deierling | |
| 6,449,284 B1 | 9/2002 | Hagirahim | |
| 6,636,269 B1 | 10/2003 | Baldwin | |
| 6,654,722 B1 | 11/2003 | Aldous et al. | |
| 6,904,025 B1 | 6/2005 | Madour et al. | |
| 6,930,661 B2 | 8/2005 | Uchida et al. | |
| 6,985,961 B1 | 1/2006 | Ramsayer et al. | |
| 7,039,205 B1 | 5/2006 | Carter et al. | |
| 7,260,186 B2 | 8/2007 | Zhu et al. | |
| 7,301,919 B2 | 11/2007 | Sundquist et al. | |
| 7,526,253 B2 | 4/2009 | Fujioka | |
| 7,673,001 B1 | 3/2010 | Battle et al. | |
| 7,693,133 B2 | 4/2010 | Benco et al. | |
| 7,716,283 B2 | 5/2010 | Thukral | |
| 7,751,848 B2 | 7/2010 | Vishwanathan et al. | |
| 7,908,630 B2 | 3/2011 | Crandall et al. | |
| 7,920,690 B2 | 4/2011 | Sylvain | |
| 7,995,721 B2 | 8/2011 | Gallick et al. | |
| 8,223,747 B2 | 7/2012 | Yarlagadda et al. | |
| 8,249,056 B2 | 8/2012 | Ku | |
| 8,369,498 B2 | 2/2013 | Dinka et al. | |
| 8,407,749 B2 | 3/2013 | McLaughlin et al. | |
| 8,413,199 B2 | 4/2013 | Laasik et al. | |
| 8,421,839 B2 | 4/2013 | Kert | |
| 8,451,315 B2* | 5/2013 | Lee | 348/14.08 |
| 8,520,050 B2 | 8/2013 | Blackburn et al. | |
| 8,711,200 B2 | 4/2014 | Blackburn et al. | |
| 8,804,925 B2 | 8/2014 | Kaal et al. | |
| 8,885,601 B2 | 11/2014 | Blackburn et al. | |
| 2002/0034166 A1 | 3/2002 | Barany et al. | |
| 2003/0023730 A1 | 1/2003 | Wengrovitz et al. | |
| 2003/0058805 A1* | 3/2003 | Meyerson et al. | 370/260 |
| 2003/0177099 A1 | 9/2003 | Gallant et al. | |
| 2004/0083297 A1 | 4/2004 | Gazzetta et al. | |
| 2004/0194146 A1 | 9/2004 | Bates et al. | |
| 2004/0213201 A1 | 10/2004 | Osterlund | |
| 2005/0009577 A1 | 1/2005 | Kangas et al. | |
| 2005/0021872 A1 | 1/2005 | Poustchi et al. | |
| 2005/0034079 A1 | 2/2005 | Gunasekar et al. | |
| 2005/0041793 A1 | 2/2005 | Fulton et al. | |
| 2005/0122963 A1 | 6/2005 | Jeon et al. | |
| 2005/0197061 A1 | 9/2005 | Hundal | |
| 2005/0268334 A1 | 12/2005 | Hesselink et al. | |
| 2005/0278778 A1 | 12/2005 | D'Agostino et al. | |
| 2006/0013194 A1 | 1/2006 | Baumann et al. | |
| 2006/0034327 A1 | 2/2006 | Tanimoto | |
| 2006/0045070 A1 | 3/2006 | Fotta et al. | |
| 2006/0093998 A1 | 5/2006 | Vertegaal | |
| 2006/0146804 A1 | 7/2006 | Ozaki | |
| 2006/0176834 A1 | 8/2006 | Dickerson et al. | |
| 2006/0221174 A1* | 10/2006 | Yang et al. | 348/14.03 |
| 2007/0070188 A1 | 3/2007 | Shyu | |
| 2007/0091833 A1 | 4/2007 | Bauchot et al. | |
| 2007/0115348 A1 | 5/2007 | Eppel et al. | |
| 2007/0265091 A1 | 11/2007 | Aguilar, Jr. et al. | |
| 2007/0280200 A1 | 12/2007 | Patel | |
| 2007/0286202 A1 | 12/2007 | Dos Remedios et al. | |
| 2008/0062962 A1 | 3/2008 | Luck et al. | |
| 2008/0069069 A1 | 3/2008 | Schessel et al. | |
| 2008/0069087 A1 | 3/2008 | Igoe | |
| 2008/0075240 A1 | 3/2008 | Ramanathan et al. | |
| 2008/0081698 A1 | 4/2008 | Wormald et al. | |
| 2008/0091682 A1 | 4/2008 | Lim | |
| 2008/0094371 A1 | 4/2008 | Forstall et al. | |
| 2008/0157998 A1 | 7/2008 | Zuo et al. | |
| 2008/0182546 A1 | 7/2008 | Wang et al. | |
| 2008/0235587 A1 | 9/2008 | Heie et al. | |
| 2008/0239995 A1 | 10/2008 | Lee et al. | |
| 2009/0017792 A1 | 1/2009 | Matsumoto et al. | |
| 2009/0046839 A1 | 2/2009 | Chow et al. | |
| 2009/0049190 A1 | 2/2009 | Jiang et al. | |
| 2009/0094684 A1 | 4/2009 | Chinnusamy et al. | |
| 2009/0136016 A1 | 5/2009 | Gornoi et al. | |
| 2009/0138697 A1 | 5/2009 | Kim et al. | |
| 2009/0168756 A1 | 7/2009 | Kurapati et al. | |
| 2009/0172170 A1* | 7/2009 | Rey | 709/227 |
| 2009/0175509 A1 | 7/2009 | Gonion et al. | |
| 2009/0177601 A1 | 7/2009 | Huang et al. | |
| 2009/0185792 A1 | 7/2009 | Braunstein et al. | |
| 2009/0225750 A1 | 9/2009 | Hawkins | |
| 2009/0232084 A1 | 9/2009 | Li et al. | |
| 2009/0238170 A1 | 9/2009 | Rajan et al. | |
| 2009/0254339 A1 | 10/2009 | Seguin | |
| 2009/0271820 A1 | 10/2009 | Choi et al. | |
| 2009/0280789 A1 | 11/2009 | Takumo et al. | |
| 2010/0008523 A1 | 1/2010 | Demuynck et al. | |
| 2010/0046731 A1 | 2/2010 | Gisby et al. | |
| 2010/0060715 A1 | 3/2010 | Laasik et al. | |
| 2010/0254670 A1 | 10/2010 | Amsterdam et al. | |
| 2011/0021200 A1 | 1/2011 | Yi et al. | |
| 2011/0047282 A1 | 2/2011 | Denman et al. | |
| 2011/0109715 A1 | 5/2011 | Jing et al. | |
| 2011/0110504 A1 | 5/2011 | Kaal et al. | |
| 2011/0119490 A1 | 5/2011 | Kaal et al. | |
| 2011/0141925 A1 | 6/2011 | Velenko et al. | |
| 2011/0177801 A1 | 7/2011 | Heit et al. | |
| 2011/0216671 A1 | 9/2011 | Walley et al. | |
| 2011/0222466 A1 | 9/2011 | Pance et al. | |
| 2011/0242266 A1 | 10/2011 | Blackburn et al. | |
| 2011/0242268 A1 | 10/2011 | Kim et al. | |
| 2011/0242270 A1 | 10/2011 | Dinka | |
| 2011/0243125 A1 | 10/2011 | Kaal et al. | |
| 2011/0243141 A1 | 10/2011 | Blackburn et al. | |
| 2011/0244955 A1 | 10/2011 | Dinka et al. | |
| 2011/0261143 A1 | 10/2011 | Ponsford | |
| 2012/0087367 A1 | 4/2012 | Anikin | |
| 2012/0105475 A1 | 5/2012 | Tseng | |
| 2012/0169831 A1* | 7/2012 | Nietfeld et al. | 348/14.08 |
| 2012/0182988 A1 | 7/2012 | Brenes | |
| 2012/0206553 A1 | 8/2012 | MacDonald | |
| 2012/0207147 A1 | 8/2012 | MacDonald | |
| 2013/0136089 A1 | 5/2013 | Gillett | |
| 2013/0230023 A1 | 9/2013 | Gray et al. | |
| 2014/0016608 A1 | 1/2014 | Buer et al. | |
| 2014/0112333 A1 | 4/2014 | Oberle et al. | |
| 2014/0300825 A1 | 10/2014 | Blackburn et al. | |

FOREIGN PATENT DOCUMENTS

| | | |
|---|---|---|
| CN | 101039307 | 9/2007 |
| CN | 101212556 | 7/2008 |
| CN | 102257791 | 11/2011 |
| EP | 1475939 | 11/2004 |
| EP | 1592198 A1 | 11/2005 |
| EP | 1816843 | 8/2007 |
| EP | 1909467 | 4/2008 |
| EP | 2063612 | 5/2009 |
| EP | 2088735 | 8/2009 |
| EP | 2114062 | 11/2009 |
| EP | 2056601 | 8/2011 |
| GB | 2479180 | 10/2011 |
| JP | 200586765 | 3/2005 |
| WO | WO-2004066604 | 8/2004 |
| WO | WO-2005008524 | 1/2005 |
| WO | WO 2005009019 | 1/2005 |
| WO | WO-2005009019 | 1/2005 |
| WO | WO-2006051492 | 5/2006 |
| WO | WO-2006058036 | 6/2006 |
| WO | WO-2007023208 | 3/2007 |
| WO | WO-2007137485 | 6/2007 |
| WO | WO-2007118250 | 10/2007 |
| WO | 2007126652 A2 | 11/2007 |
| WO | WO-2008015369 | 2/2008 |
| WO | WO-2009115048 | 9/2009 |
| WO | WO-2010026187 | 3/2010 |
| WO | WO-2010026188 | 3/2010 |
| WO | WO-2010026189 | 3/2010 |
| WO | WO-2010026190 | 3/2010 |
| WO | WO-2010026191 | 3/2010 |

(56) References Cited

FOREIGN PATENT DOCUMENTS

| WO | WO-2010026194 | 3/2010 |
|---|---|---|
| WO | WO-2010026196 | 3/2010 |
| WO | WO-2011120948 | 10/2011 |
| WO | WO-2011120991 | 10/2011 |
| WO | WO-2011120992 | 10/2011 |
| WO | WO-2011121006 | 10/2011 |

OTHER PUBLICATIONS

"Non-Final Office Action", U.S. Appl. No. 12/843,527, Mar. 14, 2014, 14 pages.
"Non-Final Office Action", U.S. Appl. No. 13/340,508, Mar. 12, 2014, 9 pages.
"Notice of Allowance", U.S. Appl. No. 12/941,585, Mar. 31, 2014, 7 pages.
Sparks, "The Session Initiation Protocol (SIP) Refer Method", Retrieved from <https://datatracker.ietf.org/doc/rfc3515/> on Jan. 11, 2014, Apr. 2003, 20 pages.
"International Search Report", Mailed Date: Mar. 26, 2013, Application No. PCT/US2012/072025, Filed Date: Dec. 28, 2012, pp. 12.
"Bluetooth Profile", downloaded Jun. 28, 2010 from http://en.wikipedia.org/w/index.php?title=Bluetooth_profile &oldid=330823199, accessed Dec. 10, 2009, 9 pages.
"Femtocell", downloaded Jun. 28, 2010 from http://en.wikipedia.org/w/iindex.php?title=Femtocell&oldid=330068819, accessed Dec. 10, 2009, (Jun. 9, 2012), 8 pages.
"Final Office Action", U.S. Appl. No. 12/290,232, (Dec. 6, 2012),18 pages.
"Final Office Action", U.S. Appl. No. 12/843,543, (Aug. 3, 2012), 8 pages.
"International Search Report and Written Opinion", Application No. PCT/EP2011/054781, (May 23, 2011),13 pages.
"International Search Report and Written Opinion", Application No. PCT/EP2011/054864, (May 31, 2011),13 pages.
"International Search Report and Written Opinion", Application No. PCT/EP2011/054862, (Jun. 27, 2011),17 pages.
"International Search Report and Written Opinion", Application No. PCT/EP2011/054881, (Jul. 25, 2011),18 pages.
"International Search Report and Written Opinion", International Application No. PCT/EP2011/074303, (May 29, 2012), 11 pages.
"International Search Report and Written Opinion", PCT Application PCT/EP2010/066562, (Feb. 23, 2011), 11 pages.
"International Search Report and Written Opinion", PCT Application PCT/EP2010/066561, (Sep. 26, 2011), 13 pages.
"International Search Report and Written Opinion", PCT Application PCT/EP2011/054879, (Jun. 24, 2011), 13 pages.
"International Search Report", Application No. PCT/EP2011/074304, (Feb. 7, 2012), 3 pages.
"IP-DECT", downloaded Jun. 28, 2010 from http://en.wikipedia.org/w/index.phptitle=IPDECT&oldid=322769463, accessed Dec. 10, 2009, (Oct. 29, 2009), 1 page.
"MagicJack Harnesses Femtocell for VoIP", downloaded Jun. 28, 2010 from http://.pcworld.com/article/186308/magicjack_harnesses_femtocell_for_voip.html, dated Jan. 8, 2010, accessed Feb. 4, 2010, 7 pages.
"Non-Final Office Action", U.S. Appl. No. 12/290,232, (Jun. 11, 2012), 16 pages.
"Non-Final Office Action", U.S. Appl. No. 12/824,681, (Oct. 10, 2012), 13 pages.
"Non-Final Office Action", U.S. Appl. No. 12/843,543, (May 29, 2012), 9 pages.
"Non-Final Office Action", U.S. Appl. No. 12/843,569, (Apr. 4, 2012), 13 pages.
"PCT Search Report and Written Opinion", Application No. PCT/EP2011/074302, (Mar. 6, 2012), 11 pages.
"Search Report", Application No. GB1005462.5, (Jul. 28, 2011), 2 pages.
"Search Report", GB Application 0919591.8, (Feb. 23, 2011), 2 pages.
"Search Report", GB Application 0919592.6, (Feb. 24, 2011), 1 page.
Saint-Andre, Peter "Streaming XML with Jabber/XMPP", IEEE Internet Computing, vol. 9, No. 5,(Sep. 1, 2005), pp. 82-89.
"Non-Final Office Action", U.S. Appl. No. 12/941,585, (Jun. 12, 2013), 9 pages.
"Extended European Search Report", EP Application No. 12199326.5, Apr. 3, 2013, 6 pages.
"Final Office Action", U.S. Appl. No. 12/843,527, Oct. 24, 2013, 10 pages.
"Final Office Action", U.S. Appl. No. 12/941,585, Nov. 18, 2013, 10 pages.
"Non-Final Office Action", U.S. Appl. No. 12/824,681, Oct. 15, 2013, 27 pages.
"Non-Final Office Action", U.S. Appl. No. 12/941,585, (Dec. 31, 2012), 11 pages.
"Voice over IP (VOIP) Phone System Provider, Philadelphia Pa", Retrieved from <http://www.expertta.com/philadelphia-pa-voice-over-ip-system-provider> on Dec. 11, 2012, (Jan. 17, 2010), 2 pages.
Mock, et al., "A Voice over IP Solution for Mobile Radio Interoperability", *IEEE 56th Vehicular Technology Conference*, Retrieved from <http://ieeexplore.ieee.org/stamp/stamp.jsp?tp=&arnumber=1040433>,(Sep. 24, 2002), 4 pages.
Oprea, et al., "Securing a Remote Terminal Application with a Mobile Trusted Device", *20th Annual Conference on Computer Security Applications*, Retrieved from <http://www.rsa.com/rsalabs/staff/bios/aoprea/publications/acsac.pdf>,(Dec. 6, 2004), 10 pages.
"Advisory Action", U.S. Appl. No. 12/290,232, (Jan. 29, 2013), 3 Pages.
"Final Office Action", U.S. Appl. No. 12/824,681, (Mar. 15, 2013), 14 pages.
"Non-Final Office Action", U.S. Appl. No. 12/843,527, (Mar. 29, 2013), 11 pages.
"Corrected Notice of Allowance", U.S. Appl. No. 12/843,569, Feb. 21, 2014, 2 pages.
"Final Office Action", U.S. Appl. No. 12/290,232, Jul. 16, 2014, 22 pages.
"Final Office Action", U.S. Appl. No. 12/824,681, Jul. 2, 2014, 31 pages.
"Final Office Action", U.S. Appl. No. 12/843,293, Jun. 11, 2013, 9 pages.
"Final Office Action", U.S. Appl. No. 12/843,293, Apr. 9, 2014, 10 pages.
"Final Office Action", U.S. Appl. No. 12/843,569, Oct. 9, 2012, 20 pages.
"Final Office Action", U.S. Appl. No. 13/340,508, Jun. 24, 2014, 7 pages.
"Foreign Notice of Allowance", EP Application No. 11712232.5, Feb. 4, 2014, 6 pages.
"Foreign Notice of Allowance", EP Application No. 11808879.8, Aug. 20, 2014, 7 pages.
"Foreign Office Action", CN Application No. 201180016940.4, Apr. 22, 2014, 16 pages.
"Foreign Office Action", CN Application No. 201180016951.2, May 22, 2014, 19 pages.
"Foreign Office Action", CN Application No. 201180016975.8, Jun. 27, 2014, 15 pages.
"Foreign Office Action", EP Application No. 11712232.5, Jun. 20, 2013, 4 pages.
"Foreign Office Action", EP Application No. 11713480.9, Jun. 17, 2013, 4 pages.
"Foreign Office Action", EP Application No. 11818918.2, Apr. 11, 2014, 6 pages.
"Non-Final Office Action", U.S. Appl. No. 12/843,293, Jan. 30, 2013, 9 pages.
"Non-Final Office Action", U.S. Appl. No. 12/843,293, Sep. 23, 2013, 9 pages.
"Non-Final Office Action", U.S. Appl. No. 12/843,569, Apr. 19, 2013, 23 pages.
"Non-Final Office Action", U.S. Appl. No. 13/340,492, Oct. 3, 2014, 14 pages.
"Non-Final Office Action", U.S. Appl. No. 13/340,524, Sep. 2, 2014, 10 pages.

(56) References Cited

OTHER PUBLICATIONS

"Notice of Allowance", U.S. Appl. No. 12/843,527, Jul. 9, 2014, 11 pages.
"Notice of Allowance", U.S. Appl. No. 12/843,543, Oct. 15, 2012, 6 pages.
"Notice of Allowance", U.S. Appl. No. 12/843,569, Dec. 11, 2013, 11 pages.
"Notice of Allowance", U.S. Appl. No. 13/340,508, Sep. 30, 2014, 6 pages.
"Summons to Attend Oral Proceedings", EP Application No. 11713480.9, Aug. 6, 2014, 4 pages.
"Foreign Office Action", CN Application No. 201180017018.7, Oct. 10, 2014, 16 pages.
"Foreign Office Action", CN Application No. 201180063604.5, Dec. 11, 2014, 16 pages.
"Foreign Office Action", CN Application No. 201210582330.7, Nov. 15, 2014, 16 pages.
"Foreign Office Action", EP Application No. 11712231.7, Nov. 6, 2014, 5 pages.
"Non-Final Office Action", U.S. Appl. No. 13/752,298, Dec. 19, 2014, 28 pages.
"Supplemental Notice of Allowance", U.S. Appl. No. 13/340,508, Jan. 23, 2015, 2 pages.

* cited by examiner

Figure 5

MAKING CALLS USING AN ADDITIONAL TERMINAL

RELATED APPLICATION

This application claims priority under 35 USC 119 to U.S. Application No. 61/581,995 filed 30 Dec. 2011, the disclosure of which is incorporated in its entirety.

BACKGROUND

Communication systems exist which allow a live voice and/or video call to be conducted between two or more end-user terminals over a packet-based network such as the Internet, using a packet-based protocol such as internet protocol (IP). This type of communication is sometimes referred to as "voice over IP" (VoIP) or "video over IP".

To use the communication system, each end user first installs a client application onto a memory of his or her user terminal such that the client application is arranged for execution on a processor of that terminal. To establish a call, one user (the caller) indicates a username of at least one other user (the callee) to the client application. When executed the client application can then control its respective terminal to access a database mapping usernames to IP addresses, and thus uses the indicated username to look up the IP address of the callee. The database may be implemented using either a server or a peer-to-peer (P2P) distributed database, or a combination of the two. Once the caller's client has retrieved the callee's IP address, it can then use the IP address to request establishment of a live voice and/or video stream between the caller and callee terminals via the Internet or other such packet-based network, thus establishing a call. An authentication procedure is typically also required, which may involve the user providing credentials via the client to be centrally authenticated by a server, and/or may involve the exchange of authentication certificates between the two or more users' client applications according to a P2P type authentication scheme.

With the increasing prevalence of electronic devices capable of executing communication software, both around the home and in portable devices on the move, then it is possible that multiple different terminals may be available at one end of the call, each having audio and/or video inputs and each of which could potentially be installed with an instance of the client application. In such cases it may be desirable to consider how best exploit these multiple resources to maximise the usefulness of the communication system.

Further, there are some existing arrangements that provide a remote interface for a call. For example Bluetooth headsets provide an input/output interface that is remote from the phone that handles the call. DECT phones (Digital Enhanced Cordless Telephones) provide handsets that are remote from the base station. There also exists a video application, running on a smart phone, and showing up on a computer as a video device in the list of video devices (such that it can be used e.g. in a VoIP client by simply selecting it in the video device list).

SUMMARY

According to one or more embodiments of the present invention there are provided an apparatus, computer programs and a method for handling voice and/or video calls over a packet-based network (e.g the Internet) when multiple near-end terminals having audio and/or video transducers are potentially available on a local link (e.g. wi-fi) for use in the call. For example the near-end terminals may comprise one or more laptops, tablets, mobile phones, television sets and/or set-top boxes located around the home. Embodiments may exploit the availability of multiple available terminals for the purpose of conducting packet-based calls.

According to or more embodiments, there is provided an arrangement comprising a first terminal and a plurality of second terminals. The first terminal is coupled to a wide-area packet-based communication network and installed with a mixer client application for performing a voice or video call using a packet-based communication system implemented over the packet-based network. The plurality of second terminals are coupled to the first terminal via a local wireless link, and are each installed with a respective instance of a lightweight sub-client for participating in the call via the mixer client, but having reduced functionality relative to the mixer client.

The mixer client may be configured to establish the call with a remote, third terminal over the packet-based network using the packet-based communication system, based on a user credential identifying the mixer client as an endpoint of the call within the packet-based communication system from the perspective of the third terminal. Each of the second terminals may be operable to simultaneously generate a respective audio and/or video stream each associated with a different respective near-end user, and each respective sub-client may be configured to transmit the respective stream to the mixer client over the local wireless link, to be used in the call established by the mixer client under identification by said user credential.

The mixer client may be configured to switch between a multi-terminal state of operation in which the call uses the streams received from the sub-clients and a same-terminal state of operation in which the call uses a stream generated by the first terminal without the streams from the sub-clients. In the multi-terminal state of operation the mixer client is configured to mix the simultaneous streams received from the sub-clients at the first terminal, to encode the mixed stream at the first terminal, and to transmit the mixed stream to the third terminal as part of said call over the packet-based communication system under identification by said user credential.

According to one or more other embodiments, there is provided an arrangement comprising a first terminal and one or more second terminals. The first terminal is coupled to a wide-area packet-based communication network and installed with a first client application for performing a voice or video call using a packet-based communication system implemented over the packet-based network. The one or more second terminals are coupled to the first terminal via a local wireless link, and are each installed with a respective instance of a lightweight sub-client for participating in the call via the first client, but having reduced functionality relative to the first client.

The first client may be configured to establish the call with a remote, third terminal over the packet-based network using the packet-based communication system, based on a user credential identifying the first client as an endpoint of the call within the packet-based communication system from the perspective of the third terminal. Each of the one or more second terminals may be operable to generate a respective audio and/or video stream each associated with a respective near-end user, and each of the one or more respective sub-clients may be configured to transmit the respective stream to the first client over the local wireless link, to be used in the call established by the first client under identification by said user credential.

The first client may be configured to switch between a second state of operation in which the call uses the one or more streams received from the one or more sub-clients and a first state of operation in which the call uses a stream generated by the first terminal without the streams from the sub-clients. In the second state of operation the first client is configured to encode the one or more streams received from the one or more sub-clients into an encoded stream at the first terminal, and to transmit the encoded stream to the third terminal as part of said call over the packet-based communication system under identification by said user credential.

According to one or more further embodiments, there is provided a mixer or first client application in accordance with the above.

According to one or more further embodiments, there is provided a sub-client application in accordance with the above.

In relation to any of the above embodiments, any of the following optional features may or may not apply.

The reduced functionality may comprise one or more of:
(a) the sub-client is an input-only client configured only to receive an input audio and/or video stream for transmission to the third terminal via the mixer or first client on the first terminal and not to play out an output audio and/or video stream of said call, whilst in both states of operation the mixer or first client is configured to play out at the first terminal an output audio and/or video stream of said call received from the third terminal;
(b) the sub-client is configured only to communicate on the local link and not using the packet-based communication system implemented over said packet-based communication network;
(c) the sub-client is not configured with a call set-up protocol for establishing a call using said packet-based communication system, whereas the mixer or first client is configured with a call set-up protocol for establishing said call;
(d) the sub-client is configured not to take user credentials of the packet-based communication system and so the near-end user does not log in to the sub-client using credentials of the packet-based communication system;
(e) the sub-client does not encode the audio and/or video stream so as to compress it when sent to the mixer or first client over the local link, whilst the mixer or first client does encode the mixed stream so as to compress it when transmitted to the third terminal over the packet-based communication system;
(f) the sub-client uses only a reduced compression of the audio and/or video stream sent to the mixer or first client over the local link, relative to compression used by the mixer or first client to compress the mixed stream to the third terminal over the packet-based communication system; and
(g) the sub-client does not encrypt the audio and/or video stream sent to the first client over the local link, whilst the mixer or first client does encrypt the mixed stream transmitted to the third terminal over the packet-based communication system.

The mixer or first client may be configured to detect the presence of one or more instances of the sub-clients on the local link, and to switch between said states in dependence on said detection.

The mixer or first client may be configured to detect the stream incoming from one or more of the sub-clients on the local link, and to switch between said states in dependence on said detection.

The switching in dependence on the detection may comprise presenting a near-end user with a user option at the first terminal to select the one or more sub-clients for use in the multi-terminal or second state of operation.

The switching may be in dependence on the detection comprises automatically switching between said states of operation.

The mixer or first client may be configured to use the same-terminal or first state of operation as a default state in absence of the presence of the instances of the sub-client and/or in absence of the streams from the sub-clients.

The mixer or first client may be configured to mix the streams of a plurality of simultaneously active speakers from amongst said near-end users.

The mixer or first client may be configured to mix the streams by determining which of the streams received from the sub-clients best represents an active speaker from amongst said near-end users, and selecting only the stream of the active speaker to be transmitted to the third terminal as party of said call.

The mixer or first client may be a master client configured to establish said call using a call set-up protocol implemented at the mixer client.

A further client may be installed on a server, and the mixer or first client may be configured to act as a relay to mix and/or encode the streams at the first terminal and establish the call via a call-set-up protocol implemented at the further client.

The first terminal may be one of a monitor with embedded processor, a television set, and a set-top box for plugging into a monitor television set.

At least one of the one or more second terminals may be one of a laptop, tablet and a mobile phone.

The local wireless link may be a local wireless network. The packet-based communication network may be the internet. The communication system may be a VoIP system.

According to one or more further embodiments there is provided a method comprising operations performed by any of the above elements.

DETAILED DESCRIPTION

Embodiments of the invention use already existing devices as remote input devices to an instance of a VoIP client running on a different device. The Remote Input DEvice (RIDE as it may be referred to herein) could be for example a smartphone, laptop or tablet running an RIDE client application; and could be useful in conferencing room scenarios, for VoIP on TV sets or set-top boxes, or simply as a remote wireless microphone to a main VoIP client running on a desktop computer. The embodiments described herein can be implemented in connection with any suitable hardware, software, firmware or combination thereof. In at least some instances, embodiments can be implemented in the form of computer-readable instructions stored on a computer-readable storage medium. As used herein, "computer-readable storage medium" is intended to refer to all statutory forms of storage media. As such, "computer-readable storage medium" is not intended to cover non-statutory subject matter such as carrier waves or signals per se.

RIDE utilizes already existing hardware as input devices to a VoIP client running on another device. In particular, it would be possible to use smart phones, tablets or laptops as microphones and/or video cameras in conferencing scenarios, or as input devices for VoIP running on TVs or set-top boxes for plugging into TV sets.

The system may use several remote devices simultaneously, to input both audio and video. Also, the remote devices may not be exposed as "normal" devices on a desktop, but completely integrated into a VoIP client, and have the VoIP client auto-detect them etc. and use them together with terminals other than desktop computers (such as TVs).

Embodiments of the present invention may advantageously provide improved audio quality by using many devices, each device being close to the speaker (e.g. which could be useful in the conferencing room scenario).

Embodiments of the invention may also be useful in a VoIP-on-TV scenario, potentially eliminating the need to buy external video cameras and/or microphones. It is also believed that audio quality in this case will be improved since the microphone(s) will be much closer to the talkers.

In a video conferencing scenario, embodiments of the invention may facilitate sending one video stream from each of the participants in the room (running the RIDE client application on their device) as opposed to sending only one stream for the whole room. In embodiments it may also be possible to leverage use of hardware video encoding available on the devices.

There are many reasons to why the above arrangements could potentially be beneficial:

Many of today's devices (such as modern smartphones) have fairly good quality input audio capabilities. Using devices placed on the conferencing table would in many cases significantly improve audio quality, and/or constitute an affordable and practical way to get a multi-microphone set-up.

For TVs, it would mean that the microphone(s) can be placed much closer to the speaker, and thereby potentially significantly increase audio quality, and potentially no wires required. Combined with video, it might also mean that users would not have to buy any additional device for their TV to use a VoIP system.

In the video case, it might be possible to use hardware accelerated video encoding available on the device.

Devices with good A/V (audio and/or video) input capabilities can be used as remote input devices (RIDEs) to a main VoIP client instance running on a different device. The remote input device could either be implemented in a VoIP client, or it could be implemented as a stand-alone application running on a smartphone, tablet or laptop. The RIDEs may facilitate low-delay recording of audio and/or video, and send the stream(s) to a RIDE mixer. The connection could be over e.g. WLAN, or a Bluetooth data connection.

Figure 5:
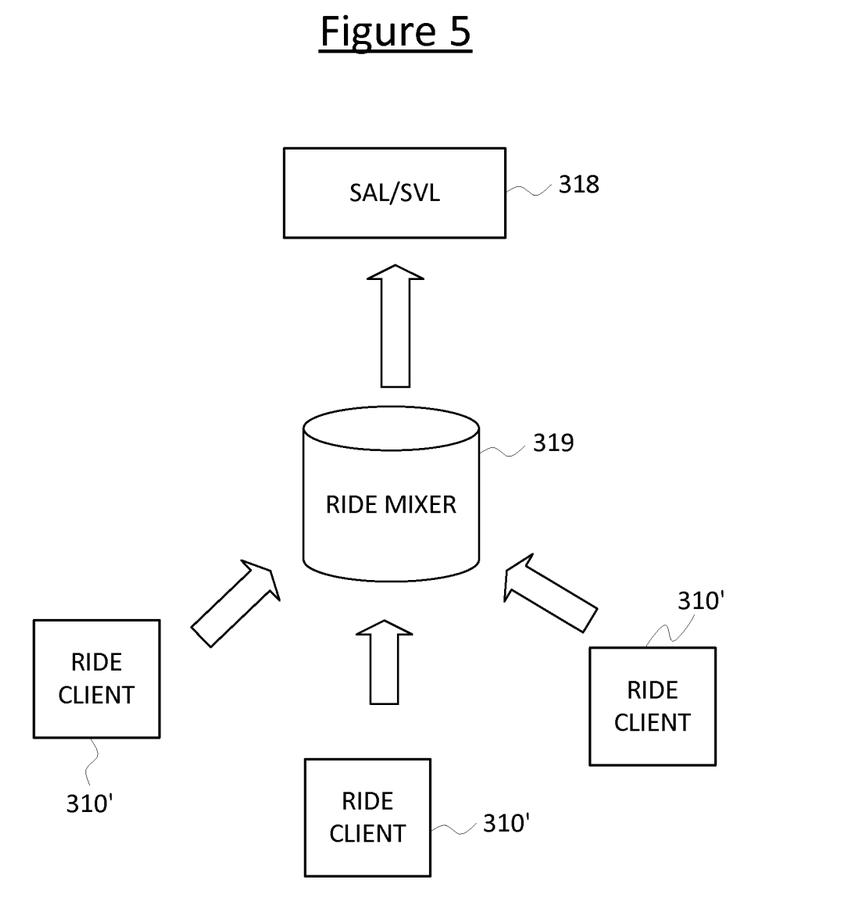
FIG. 5 is a schematic block diagram of one end of the communication system.

The RIDE mixer combines the streams into something meaningful, which is then input into the VoIP client. See for example FIG. 5, the elements of which will be returned to in more detail later.

In the audio case, the mixing may mean detecting the active speaker and inputting only that stream into the VoIP client. It might also be the more complicated case of time-aligning and truly mixing the signals. A third option for a two-channel case, is to create a stereo stream by using the input from one RIDE on the left channel and the input from the other on the right channel. The two RIDEs would then effectively implement a stereo microphone.

In the video case, the "mixing" could again consist of passing on only the stream corresponding to the currently active speaker. Alternatively it could forward all streams.

In some embodiments, the RIDE mixer is integrated in the main VoIP client, and hooks into the audio and video library respectively.

There may also be provided some form of network discovery service running, so the system can automatically detect when a (paired) RIDE is available for use. The UI can then prompt the user as to whether he/she wants to use the RIDE(s).

The connections between the RIDE(s) and the RIDE mixer may be encrypted.

Architecture: RIDE may consist of two main components: the RIDE client and the RIDE mixer. There may be multiple RIDE clients connected to each mixer. The clients send, for example, UDP payloads corresponding to short audio frames (or video) to the mixer on the local wi-fi network (or possibly over a Bluetooth data connection).

The RIDE client could be integrated in a "normal" VoIP client, such that it can be used as a remote input device. This might however become confusing to the user. Another idea would be to ship RIDE as a separate application. The client would then be a light-weight stand-alone application able to connect to a remote RIDE mixer.

In some embodiments, the RIDE mixer is a module integrated in an otherwise normal "main" VoIP client. It needs networking abilities and hooks into the audio and video libraries. To external libraries, RIDE might show up as an additional "device" when enumerating audio and video devices. To facilitate easy connectivity of devices, the RIDE mixer module might also run some form of network discovery service such as UPNP or Bonjour.

When using multiple input devices, the RIDE mixer is responsible for aligning the input signals and combining them into an enhanced signal. In the audio-only case, this might be something such as selecting the input device corresponding to the currently active speaker. Alternatively it could comprise mixing two or more simultaneously active streams.

For the video case, the mixer may do many things: it may pick only one stream (for example corresponding to the active speaker), or it may just pass on all stream (if the VoIP client supports sending multiple video streams).

Figure 1:
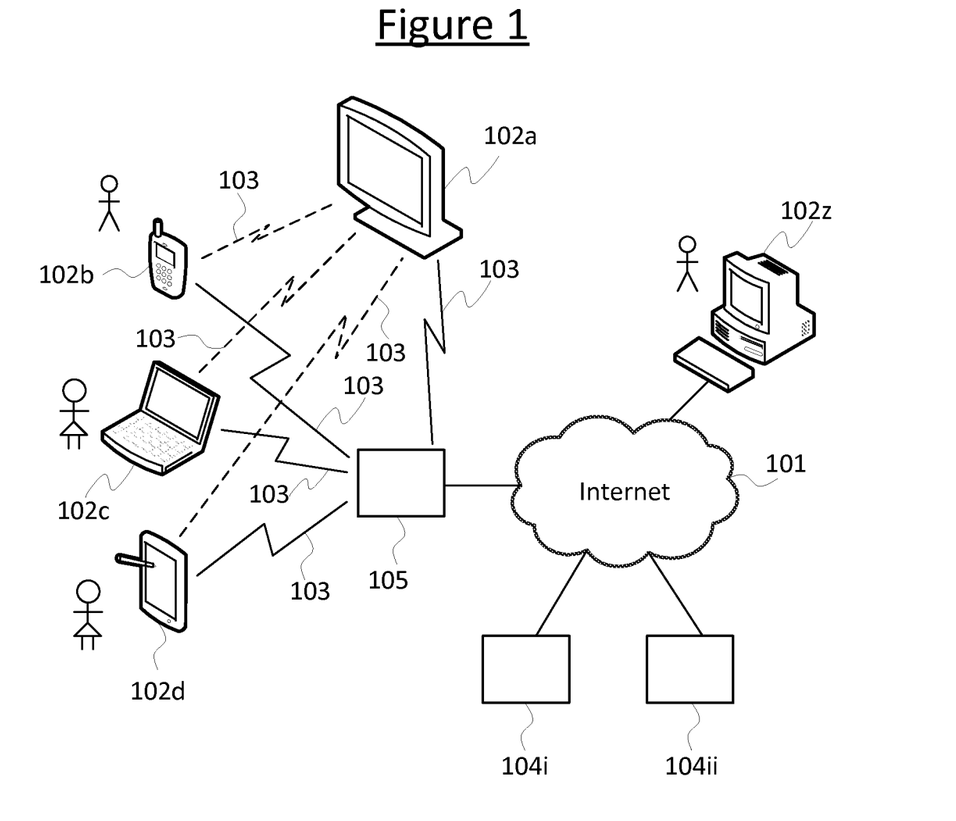
FIG. 1 is a schematic representation of a communication system.

FIG. 1 is a schematic diagram of a communication system implemented over a packet-based network 101, e.g., a wide-area internetwork such as the Internet. The communication system comprises a plurality of user terminals 102, including a first user terminal 102a, a plurality of second user terminals 102b-102d, and a third user terminal 102z. Each of the user terminals 102 could take the form of any of a desktop computer, laptop computer, tablet, mobile phone (which may also be referred to as a "smartphone"), a television set with embedded processor and TV receiver, a monitor without TV receiver but with embedded processor, and a set-top box for plugging into a TV set or monitor by a wired connection. In one or more embodiments, the first terminal 102a comprises a large TV set or monitor, e.g. in a conference room or living room, and each of the second terminals 102b-d comprises one of a laptop, tablet or smartphone.

Each of the second terminals 102b, 102c and 102d is associated with a different respective user, e.g. different participants in a multi-party voice or video call.

Each of the first user terminal 102a and the third user terminal 102z (as well as plurality of other user terminals not shown) comprises a respective instance of a VoIP client. At least the VoIP client 310 on the first terminal 102a comprises a RIDE mixer in accordance with one or more embodiments. Further, each of the second terminals is installed with a respective instance of a stripped-down, lightweight client application 310' which may be referred to herein as a RIDE client. The VoIP client 310 comprising the RIDE mixer on the first terminal 102a may be thought of as a main client and the RIDE clients 310' on the second terminals 102b-d may be thought of as sub-clients. Their relationship will be discussed further shortly. See also FIGS. 3, 4 and 5.

The system may further comprise a wireless link 103 by means of which the first terminal 102a and the second terminals 102b-d may be enabled to communicate with one another, e.g. either directly or via a wireless router 105 in the office or home. The wireless link 103 may therefore take the form of a local wireless network (LAN). Local in this sense may mean in the same broadcast cell or same subnet, at most linking through one household or office router 105. An internet or mobile cellular network by contrast are examples of wide area networks that communicate via multiple routing hops or multiple levels of cellular network elements, on a scale between towns, cities or countries, and in the cellular case beyond a single cell.

In the case of a wireless router 105 comprising a modem, the wireless link 103 may also enable the terminals 102a and 102b-d to access the Internet 101.

Also shown connected to the internet 101 in FIG. 1 is a data store 104i of a packet-based communication system provided, e.g. a VoIP provider. This may take the form of either a server, a distributed peer-to-peer database, or a combination of the two. A peer-to-peer database is distributed amongst a plurality of end-user terminals of a plurality of different users, typically including one or more users who are not actually participants of the call. However, this is not the only option and a central server can be used as an alternative or in addition. Either way, the data store 104i is connected so as to be accessible via the internet 101 to each of the client applications running on each of a plurality of the terminals including the first and third user terminal 102a, 102z. The data store 104 is arranged to provide a mapping of usernames to IP addresses (or other such network addresses) so as to allow the client applications of different users to establish communication channels with one another over the Internet 101 (or other packet-based network) for the purpose of establishing voice or video calls, or indeed other types of communication such as instant messaging (IM) or voicemail. Further, one or more other servers 104ii may be connected to the Internet 101, e.g. a server of an internet service provider (ISP).

Figure 2:
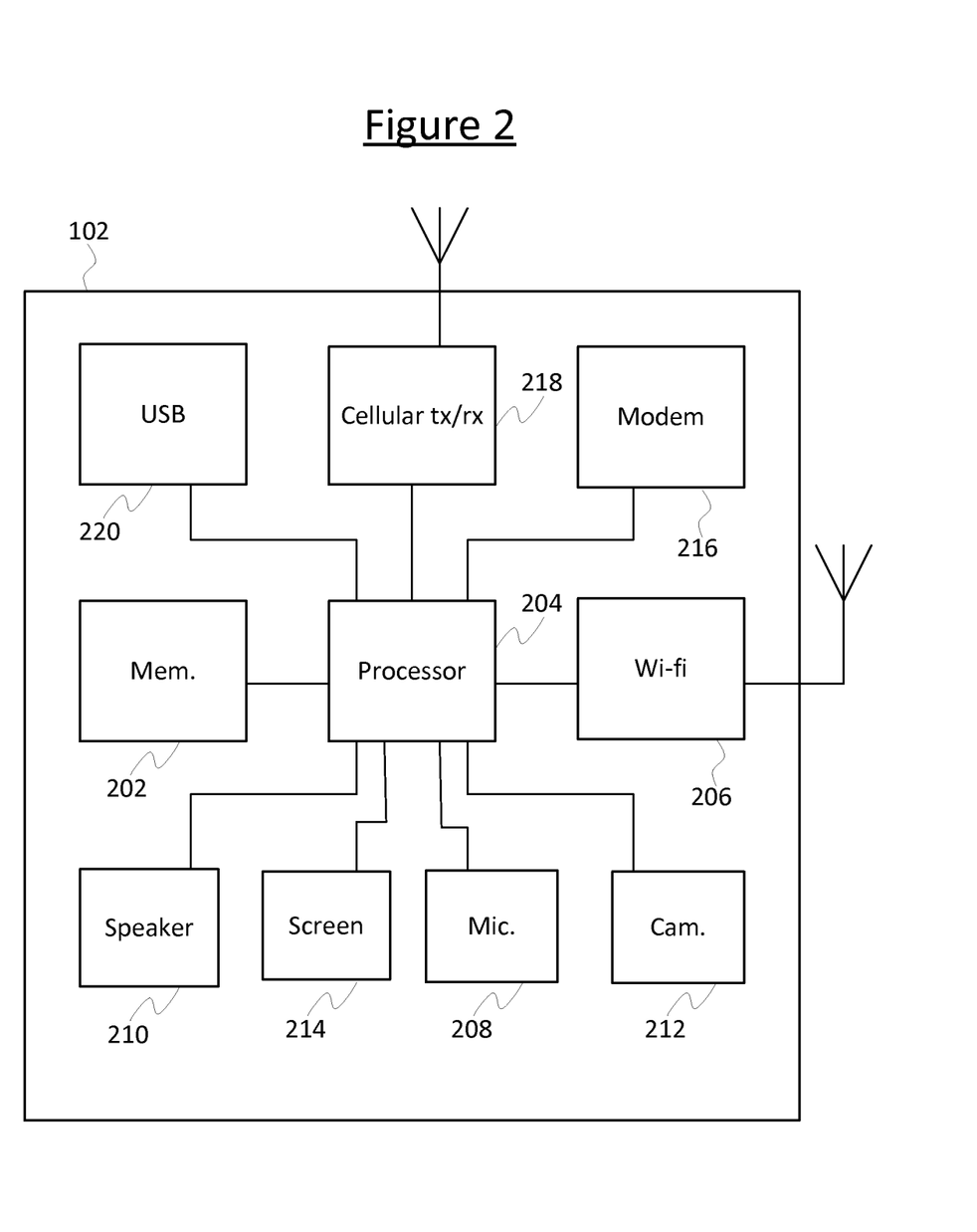
FIG. 2 is a schematic block diagram of a user terminal.

FIG. 2 shows a schematic block diagram of an exemplary end-user terminal 102 according to embodiments of the present invention, which may correspond to any of those mentioned above including the first terminal 102a, second terminals 102b-d and third terminal 102z. The user terminal 102 comprises one or more computer-readable storage media, e.g., a memory 202 such as an internal or external hard drive or flash memory, and a processing apparatus 204 in the form of a single or multi core processor. The memory 202 is installed with an instance of the relevant communication client application 310 or 310', is coupled to the processing apparatus 204, and is arranged such that the communication client can be executed on the processing apparatus 204. The terminal 102 also comprises a plurality of peripheral devices 206, 208, 210, 212, 214, 216, 218, 220 each of which is coupled to the processor, and each of which may be implemented on the same chip as the processor or a different chip, and internally or externally to the terminal's housing.

Amongst these, the terminal 102 may comprise a local wireless transceiver 206 for sending and receiving signals and data over the local wireless link 103, e.g. to or from another user terminal 102 and/or via the wireless home or office router 105, and in the case where the router 105 comprises an internet modem then this also enables the terminal 102 to communicate over the Internet 101. The terminal 102 may comprise a wireless cellular transceiver 218 for sending and receiving signals and data over a wireless cellular mobile network, which may also provide an alternative path for internet access to and from the terminal 102 if the user has a suitable contract. Further, the terminal 102 may comprise a wired modem 216 and/or an external connector 220 such as a USB (universal serial bus) port for connecting to an external modem, which again may provide an alternative means of internet access to and from the terminal 102.

The user terminal 102 further comprises a plurality of AV (audio and/or video) transducers, e.g. a microphone 208, a speaker 210, a video camera 212 (which may also be referred to as a "webcam") and a screen 214. The term AV transducer may be used herein to refer to any means of audio or video input or output. Terminal is meant as a discrete unit of user equipment whereas a transducer is a component or peripheral of a given terminal. In some situations such as that of a handset and docking station the categorisation may not be immediately apparent, but for the purpose of this application a terminal may be considered distinct if it has a processor 204 and executes its own instance of a communication client, whether the main VoIP client 310 or the lightweight sub-client 310'.

Figure 3:
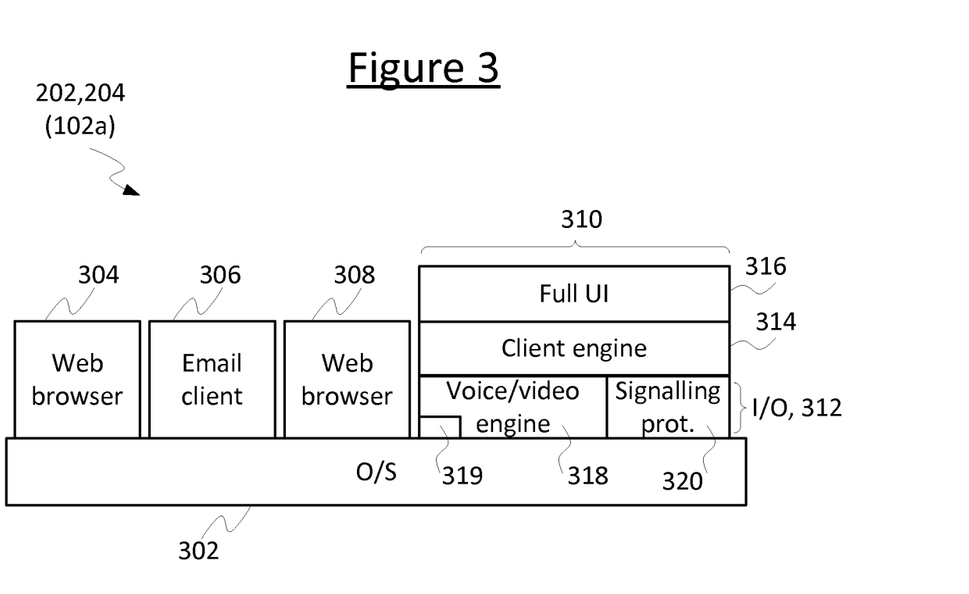
FIG. 3 is a schematic block diagram of the software running on a user terminal.

Referring to FIG. 3, the software installed on the memory 202 and arranged to execute on the processor 204 of the first user terminal 102a comprises an operating system 302, and running on the operating system 302 one or more of a plurality of applications 304, 306, 308, 310, e.g. including a web browser application 304, an email client application 306 and in the case of a TV or set-top box a TV application 308. The applications also include an instance of the main VoIP client 310. The main VoIP client 310 comprises an input/output (I/O) layer 312 comprising a signalling protocol 320 and a voice and/or video engine 318. The voice and/or video engine 318 comprises a mixer 319 in the form of the RIDE mixer. The main VoIP client 310 also comprises a client engine 314 comprising a call set-up protocol for establishing VoIP calls over the Internet 101, e.g. with the third terminal 102z; and a full user interface layer 316. The VoIP client running on the third user terminal 102z may be similar to that of the first, and may or may not comprise the mixer element 319.

Figure 4:
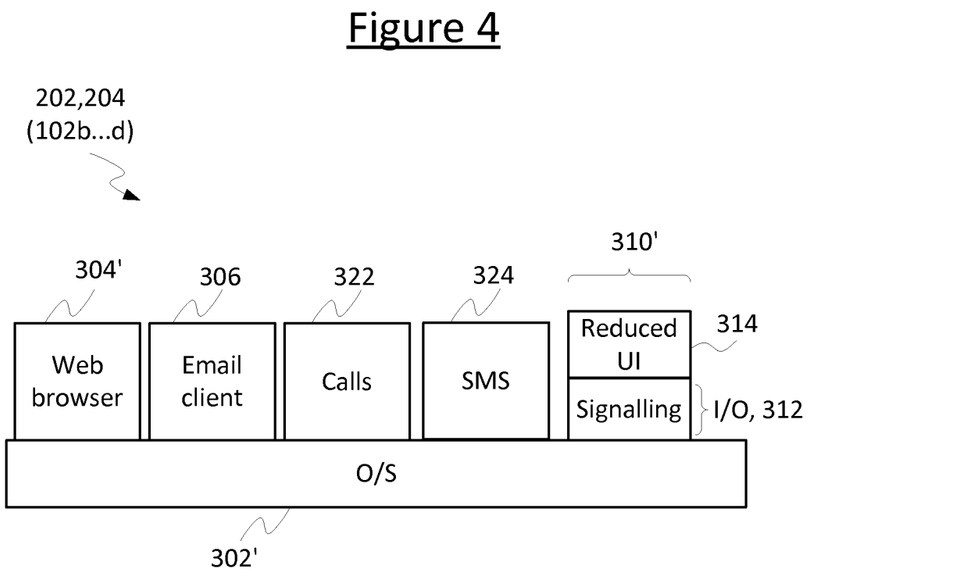
FIG. 4 is a schematic block diagram of the software running on another user terminal.

Referring to FIG. 4, the software installed on the memory 202 and arranged to execute on the processor 204 of each of the second user terminals 102b-d comprises an operating system 302', and running on the operating system 302' one or more of a plurality of applications 304', 306', 322, 324, e.g. including a web browser application 304, an email client application 306 and in the case of a mobile phone a cellular calling application 322 (e.g. circuit-switched calling) and text messaging application 324. The applications also include an instance of the lightweight sub-client 310', which may also be referred to herein as the RIDE client. This sub-client 310 comprises an input/output (I/O) layer 312 comprising a basic local signalling protocol 320' and simplified user interface layer 316'. In some embodiments, the lightweight sub-client 310' does not comprise a voice or video engine, or at least not a voice or video engine implementing the full encoding and decoding (compression and decompression) of the voice and/or video engine 318 of the main client 310. In some embodiments, the lightweight sub-client 310' also does not comprise a mixer 319. Further, the lightweight sub-client 310' may not comprise a client engine having a call set-up protocol for establishing VoIP calls over the Internet 101, i.e. so the lightweight sub-client 310' cannot itself establish a call with a terminal such as the third terminal 102z.

The above are just examples and it will be appreciated that generally any of the first, second and third user terminals could comprise any combination of the described transducers 208, 210, 212, 214 and/or transceivers 206, 216, 218, 220; and could be installed with and run any combination of the described applications 304, 304', 306, 306', 308, 322, 324.

In the illustrated arrangement of FIGS. 1 to 5 the main VoIP client 310 on the first terminal 102a is arranged to set-up a call with the VoIP client on the third terminal 102z over the Internet 101, using a VoIP communication system, via one of the transceiver 208, 210, 212, 214 and via the local wireless transceiver 206 and local wireless link 103 including via the wireless home or office router 105. The wireless link for example could be wi-fi or Bluetooth or any other suitable short-range ad-hoc wireless protocol. The VoIP clients on the first and third terminals 102a, 102z are thus able to establish a voice or video call between them, and as such exchange voice and/or video streams between them as part of the call. The relevant call set-up and generally call signalling protocol is implemented in the client engine 314 of each VoIP client. This call set-up may comprise looking up an IP address of a remote user terminal, e.g. the third terminal 102z, in the data store 104 based on submitting a username of the remote user, in the manner discussed above in relation to FIG. 1.

Further, the main VoIP client 310 on the first terminal 102a is arranged to be able to establish a local connection with each of one or more of the sub-clients 310 on one or more of the second terminals 120b-102d respectively, using the signalling protocol 320, 320' in the I/O layers of the clients 310 and 310'. For example the main VoIP client 310 on the first terminal 102a may be arranged to discover the existence of the sub-clients 310' on the wireless link 103 through a discovery protocol such as UPNP or Bonjour. Alternatively the main VoIP client 310 on the first terminal 102a may not need to be aware of the existence of the sub-clients per se, but may instead be arranged to detect the existence of an incoming audio and/or video stream from one or more of the sub-clients 310, e.g. based only on a basic hand-shake and/or header protocol for audio and/or video streams.

In one use case, the first terminal 102a is a large television set or monitor, or set-top box, located in a conference room or a shared room of a house such as the living room, and optionally equipped with a microphone 208 and/or video camera 212; and each of the second terminals 102b-102d is a portable terminal such as laptop, tablet or smart phone equipped with at least one of a microphone 208 and a video camera 212.

Each of the second terminals 102b-d is associated with a different respective user, and is able to generate a separate respective audio and/or video stream representing the voice and/or image of its different respective user. The connection over the local link 103 between the sub-clients 310' and the main VoIP client 310 advantageously enables the audio and/or video streams from the sub-clients 310' on the second terminals 102b-d to be made available as alternative inputs to the call, alternative to the microphone 208 or camera 212 on the first terminal 102a on which the main VoIP client 310 that actually established the call with the third terminal. The multiple streams from the different sub-clients are mixed at the mixer 319 of the main VoIP client 310 on the first terminal 102a, and encoded by the voice and/or video engine 318 of the main VoIP client 310 on the first terminal 102a and from there transmitted to the client on the third terminal 102z over the Internet 101 as part of the call established by the client 310 on the first terminal 102a. Established here could mean an outgoing call initiated or an incoming call accepted by the client 310 on the first terminal 102a, but either way it is established by the client 310 on the first terminal 102a in that it negotiates the call using a call set-up protocol implemented in the client 310 on the first terminal 102a and in this sense is an end-point of the call as far as the client on the third terminal 102z and the external VoIP communication system generally are concerned, i.e. it is an endpoint of the call set-up protocol.

In the case of voice mixing, the mixer 319 may be configured to detect which of multiple incoming voice streams from the sub-clients 310 on the second terminals 102b-d are active at any given time or at least best represent an active speaker or the most active speaker, e.g. based on comparing signal energy levels and/or by applying a voice recognition algorithm. The mixer 319 would then select only the stream of the most active speaker to be encoded and transmitted to the third terminal 102z as part of the call, with the selection of most active changing throughout the conversation so that the different streams are selectively interleaved throughout the call. Alternatively or additionally, the mixer 319 could blend and time-align two or more simultaneously active voice streams representing two or more simultaneously speaking users of the second terminals 102b-d.

In the case of video mixing, the mixer 319 may again be configured to detect which of multiple incoming voice streams from the sub-clients 310 on the second terminals 102b-d are active at any given time or at least best represent an active participant or the most active participant, e.g. based on an image and/or motion recognition algorithm. The mixer 319 would then select only the most active participant's video stream to be encoded and transmitted to the third terminal 102z as part of the call. Alternatively or additionally, the mixer 319 could be configured to combine the video streams from the different users of two or more of the sub-clients on different second terminals 102b-d, e.g. sending both in parallel and/or combining into a split screen representation.

As the first terminal 102a is equipped with at least one of a microphone 208 and camera 212, e.g. a webcam mounted on or near a conference room TV screen or monitor, then it is also capable of generating an audio and/or video stream for use in conducting a call with the third terminal 102z over internet 101 using the VoIP system. Hence the main client 310 is operable in two states of operation: one state which in order to conduct the call with the third terminal 102z uses one or more input streams from the one or more sub-clients 310' on one or more of the second terminals 102b-d, and one which does not and instead relies on an audio and/or video input streams generated at the first terminal 102a itself. As mentioned, the main VoIP client 310 on the first terminal 102a may also be configured to detect the presence of one or more of the sub-clients 310' on the local link 103 or to detect incoming voice or video streams on the local link 103 from one or more of the sub-clients 310'. In response to detecting either or both of these, the main VoIP client 310 may be configured to automatically add the respective detected sub-client 310' to the call, or to present a user with an option to be manually selected before they are added to the call on condition of that option being selected. The main client 310 on the first terminal 102a may be configured as the master client for the call, in that it controls the selection of which state of operation is used at any given time. In the case where a user input is required to select said option, this may be input by the user directly at the first terminal 102a or at one of the second terminals 102a which would then send a request signal to the main client 310 on the first terminal requesting selection of the option. In the latter scenario the main client 310 may still be considered to remain the master of the call in that the request is arbitrated and acted upon by the main client 310 at the first terminal 102*a*.

According to the above features, there is enabled a multi-party voice or video conference between multiple near-end users of the multiple near-end (second) terminals 102*b-d* (i.e. at the same end as the first terminal, on the same local link 103) and at least one far-end user of at least one far-end (third) terminal 102*z*.

An advantage of this arrangement is that it achieves better quality audio and/or video for each of the streams representing the different users of the second terminals 102*b*-102*d*, because each uses their own respective, personal nearby microphone and/or camera rather than a general camera or microphone for the room which will be noisier and more detached from most or all of the users in the room. For example in a conference room each user may speak through their own microphone on their own personal phone 120*b*, *c* or *d* as part of a call with another, remote user of the third terminal 102*z*, but still all view the remote user on a joint conference room TV screen or monitor 102*a*. A similar scenario could occur in a shared room of a house such as a living room with TV set.

Furthermore, the use of existing person devices for the users such as mobile phones, tablets and laptops—i.e. devices the users already possess for other purposes—means the users advantageously do not have to purchase new equipment just to participate in a multi-party call having multiple near-end users connecting at one end of the call through a main device 102*a* and local link 103. E.g. if the first terminal 102*a* is the only device installed with a full VoIP client, it is not necessary to buy extra webcams or microphones in order to conduct a call with multiple users calling through the first terminal 102*a*.

In certain use cases only a single user of a single sub-client on a single second terminal 102*b*, *c* or *d* may happen to connect to the main client 310 on the first terminal 102*a* at any given time. In this case the mixer 319 will happen only to encode and transmit one stream from one sub-client 310'. Nonetheless, the user may still derive an advantage in that they are able to use their personal (second) terminal 102*b*, *c* or *d* as closer or more convenient input source for the call without having to purchase an additional external microphone or camera for the first terminal 102*a*.

Note that the devices 102*a* and 102*b-d* are not equal in that the first terminal 102*a* is installed with and runs the main VoIP client 310 having full VoIP functionality plus the added RIDE mixer 319, whereas the second terminals 102*b-d* are each installed with only a stripped-down, lightweight version of the client 310'. This means advantageously that the second terminals 102*a* can act as input devices for the call but without themselves having to incur the full memory or processing resources associated with storing or executing a full instance of the main VoIP client 310. Some exemplary manifestations of the "lightweight" nature of the client are as follows, any or all of which may be implemented in any combination.

In one embodiment the lightweight sub-client 310' is an input only client. That is, it is configured without the ability to receive an incoming audio and/or video stream from the main VoIP client 310 as part of the call from the third terminal 102*z*, and without the ability to play out such a stream at its respective second terminal 102*b*, *c* or *d*. In this case the sub-client 310' and second terminal 102*b*, *c* or *d* are only intended to provide an alternative input source for the call and not an output means. Instead the incoming audio and/or video of the call from the third terminal 102*z* will be played out via the first terminal 102*a*, e.g. via a conference room screen.

In embodiments the lightweight sub-client 310' is configured without a VoIP call set-up protocol to directly participate in VoIP calls with remote terminals such as the third terminal 102*z* over the internet 101 using the VoIP system that the main client 310 has access to. Hence the sub-client 310' cannot in itself establish a VoIP call. Instead the sub-client 310' is only configured to establish a local connection with the main client 310 on the first terminal, over a local link 103 such as wi-fi or Bluetooth, and from there the VoIP call is established by the main client 310 on the first terminal acting as an endpoint of the call from the external perspective of the VoIP communication system, including from the perspective of the third terminal 102*z*. For example the lightweight sub-client 310' cannot look up IP addresses in the data store 104*i*, whereas the main client 310 can (by means of the client engine 314). In embodiments, the lightweight sub-client 310' may be configured without any ability to directly access the internet 101, and may only be able to communicate via the local transceiver 206 to establish a local connection with the main client 310 on the first terminal 102*a*.

N.B. the above does not necessarily mean other applications 304', 306', 322, 324 on the second terminals 102*b-d* (but not the lightweight communication client 310') cannot communicate by other means including via the internet or another network, e.g. to perform cellular calls or messaging, achieve web access or send and receive emails. But the lightweight communication client 310' and in embodiments no other application on the second terminal 102*b*, *c* or *d* is able to directly set up a VoIP call using the VoIP system in question, nor receive an incoming audio or video stream from an incoming VoIP call. In embodiments the lightweight sub-client may not be able to access the Internet or any other external communication means other than using the local transceiver 206 to establish a local connection with the main client 310 on the first terminal 102*a*.

Further, the lightweight sub-client 310 may be configured without an audio and/or video codec or with a minimal codec, so as to apply no or little encoding or decoding (i.e. for the purpose of compression and decompression). In the case of a small amount of coding being performed by the sub-client 310', this means incurring relatively few processing cycles per unit time at the expense of less compression relative to the encoding implemented by the voice and/or video engine 318 of the main VoIP client 310'. This may mean the AV engine 318 of the main client 310 has to transcode the stream or streams from the sub-clients 310'. In the case where the sub-clients apply no encoding, the audio and/or video may be sent over the local link 103 in uncompressed form and the AV engine 319 on the main client 310 doesn't need to transcode. In some embodiments the sub-client 310' may make use of hardware encoding and decoding present on the second device 102*b*, *c* or *d* but may not apply any encoding (or only a minimal amount of pre-processing) in the actual software of the sub-client 310' itself.

Further, the lightweight sub-client 310' may be configured without encryption for the streams it sends to the main client 310 over the local link 103. However, it other embodiments it may still be preferable to encryption.

Further, the lightweight sub-client 310' may be configured with a reduced or simplified user interface relative to the main client 310.

In its barest essentials, the lightweight sub-client 310' need only be a stripped-down application for streaming media samples over a local wireless link to the first terminal 102*a*.

A further distinction between the main client 310 and subclient 310' may lie in the issue of VoIP system usernames or user credentials generally within the VoIP system, and to what is required to log in to each type of client. As discussed above, each user of the VoIP system has an associated username stored in the data store 104i, where it is mapped to an IP address of the username corresponding to that terminal. When a user wants to log in at the first terminal 102a, they enter their username (and password) into the main VoIP client 310 on the first terminal 102a and the address of the first terminal 102a is made available via the data store 104i (which could be a server or P2P database or combination of the two). So if the VoIP client on the third terminal 102z needs to find the address of the first terminal 102a, it looks this up in the data store 104i using a username associated with the first terminal 102a. Hence the main client 310 is logged in with a username and the first terminal 102a and main client 310 thus have an identity within the VoIP system in question, and will appear as an endpoint of a call with a remote terminal such as the third terminal 102z from the external perspective of the VoIP system, including from the perspective of the third terminal 102z (and VoIP client on the third terminal 102z). However, in embodiments the lightweight sub-client 310' may be configured not to use a user name or other credentials of the external VoIP system, and not to require a log in process using such credentials. Hence the sub-clients 310' and second terminals 102b, c, d have no separate identity within the VoIP system, and cannot be looked up separately in the data store 104i. Instead, even in the case of a multi-party conference call with multiple near-end users, the first terminal 102a and main client 310 still appear externally (i.e. outside the local link or network 103) as a single endpoint of the call, and the presence of multiple second terminals 102b, c, d and their clients 310' on the local link or network 103 is opaque to the third terminal 102z (and to the client on the third terminal 102z).

Instead the lightweight sub-client 310' may only implement a simple pairing operation over the local link 103 with the main client 310 on the first terminal 102a. A skilled person will be familiar with the concept of "pairing" devices. Generally, two devices may need only be paired once to communicate with each other. The pairing process is typically triggered automatically the first time a device receives a connection request from a device it is not yet paired with. Once a pairing has been established, it may be remembered by the devices, which can then connect to each without user intervention. When desired, the pairing relationship can later be removed by a user. During the pairing process, the two devices involved establish a relationship by creating a shared secret which may be known as a link key. If a link key is stored by both devices they are said to be "bonded". A device that wants to communicate only with a bonded device may cryptographically authenticate the identity of the other device, and so be sure that it is the same device it previously paired with. Once a link key has been generated, an authenticated ACL link between the devices may be encrypted so that the data that they exchange over the airwaves is protected against eavesdropping. Link keys can be deleted at any time by either device.

Pairing of a second terminal 102b, c or d to the first user terminal 102a in some embodiments requires that either the second or first terminal (depending on where the pairing was initiated) shows a pin code or secret information on its display screen that has to be entered by a user into the other device being paired. However, this does not amount to logging in using a user name or other such user credentials of the VoIP system, as the PIN or secret information has no meaning within the VoIP system nor indeed any meaning beyond the two paired devices. In other embodiments, no user confirmation is required to enable the pairing, and in still further embodiments the user may be prompted to simply accept the pairing without entering secret information.

In a variant, some or all of the main client 310 could be implemented on a further terminal such as a server, e.g. a local server of a home or office network, or a server 104ii on the internet such as a server of an ISP. In this case for example, a first terminal such as TV set, monitor or set-top box 102a could be installed with a dummy client that acts as a rely between the sub-clients 310' on the second terminals 102b-d and a VoIP client on the further terminal 104ii. The VoIP call set-up would be handled by the VoIP client on the further terminal 104ii and the mixing could be handled by either the dummy client on the first terminal 102a or the VoIP client on the further terminal 104ii.

It will be appreciated that the above embodiments have been described by way of example only. Other variants may become apparent to a person skilled in the art given the disclosure herein.

The invention claimed is:

1. An arrangement comprising:
a first terminal coupled to a wide-area packet-based communication network and installed with a mixer client application for performing a voice or video call using a packet-based communication system implemented over the packet-based network;
a plurality of second terminals coupled to the first terminal via a local wireless link, each installed with a respective instance of a lightweight sub-client for participating in said call via the mixer client but having reduced functionality relative to the mixer client;
wherein the mixer client is configured to establish the call with a remote, third terminal over the packet-based network using said packet-based communication system, based on a user credential identifying the mixer client as an endpoint of the call within the packet-based communication system from the perspective of the third terminal;
each of the second terminals is operable to simultaneously generate a respective audio and/or video stream each associated with a different respective near-end user, and each respective sub-client is configured to transmit the respective stream to the mixer client over the local wireless link, to be used in the call established by the mixer client under identification by said user credential; and
the mixer client is configured to switch between a multi-terminal state of operation in which the call uses the streams received from the sub-clients and a same-terminal state of operation in which the call uses a stream generated by the first terminal without the streams from the sub-clients, and in said multi-terminal state of operation to mix the simultaneous streams received from the sub-clients at the first terminal, to encode the mixed stream at the first terminal, and to transmit the mixed stream to the third terminal as part of said call over the packet-based communication system under identification by said user credential, wherein the reduced functionality of the lightweight sub-client comprises being configured only to communicate on the local wireless link and not using the packet-based communication system implemented over said packet-based communication network, and using only a reduced compression of the audio and/or video stream sent to the mixer client over the local link, relative to compression used by the mixer client to compress the mixed stream to the third terminal over the packet-based communication system.

2. The arrangement of claim 1, wherein the reduced functionality further comprises one or more of:
- the sub-client is an input-only client configured only to receive an input audio and/or video stream for transmission to the third terminal via the mixer client on the first terminal and not to play out an output audio and/or video stream of said call, whilst in both the multi-terminal and single-terminal states of operation the mixer client is configured to play out at the first terminal an output audio and/or video stream of said call received from the third terminal;
- the sub-client is not configured with a call set-up protocol for establishing a call using said packet-based communication system, whereas the mixer client is configured with a call set-up protocol for establishing said call;
- the sub-client is not configured to take user credentials of the packet-based communication system and so the near-end user does not log in to the sub-client using credentials of the packet-based communication system;
- the sub-client does not encode the audio and/or video stream so as to compress it when sent to the mixer client over the local link, whilst the mixer client does encode the mixed stream so as to compress it when transmitted to the third terminal over the packet-based communication system;
and
- the sub-client does not encrypt the audio and/or video stream sent to the mixer client over the local link, whilst the mixer client does encrypt the mixed stream transmitted to the third terminal over the packet-based communication system.

3. The arrangement of claim 1, wherein the mixer client is configured to detect the presence of one or more instances of the sub-clients on the local link, and to switch between said states in dependence on said detection.

4. The arrangement of claim 1, wherein the mixer client is configured to detect the stream incoming from one or more of the sub-clients on the local link, and to switch between said states in dependence on said detection.

5. The arrangement of claim 3, wherein the switching in dependence on the detection comprises presenting a near-end user with a user option at the first terminal to select the one or more sub-clients for use in the multi-terminal state of operation.

6. The arrangement of claim 3, wherein the switching in dependence on the detection comprises automatically switching between said states of operation.

7. The arrangement of claim 3, wherein the mixer client is configured to use the same-terminal state of operation as a default state in absence of the presence of the instances of the sub-client and/or in absence of the streams from the sub-clients.

8. The arrangement of claim 1, wherein the mixer client is configured to mix the streams of a plurality of simultaneously active speakers from amongst said near-end users.

9. The arrangement of claim 1, wherein the mixer client is configured to mix the streams by determining which of said plurality of simultaneous streams received from the sub-clients best represents an active speaker from amongst said near-end users, and selecting only the stream of the active speaker to be transmitted to the third terminal as part of said call.

10. The arrangement of claim 1, wherein the mixer client is a master client configured to establish said call using a call set-up protocol implemented at the mixer client.

11. The arrangement of claim 1, wherein a further client is installed on a server, and the mixer client is configured to act as a relay to mix the streams at the first terminal and establish the call via a call-set-up protocol implemented at the further client.

12. The arrangement of claim 1, wherein the first terminal is one of a monitor with embedded processor, a television set, and a set-top box for connection to a monitor television set.

13. The arrangement of claim 1, wherein at least one of the one or more second terminals is one of a laptop, tablet and a mobile phone.

14. The arrangement claim 1, wherein the local wireless link is a local wireless network.

15. The arrangement of claim 1, wherein the packet-based communication network is the Internet.

16. The arrangement of claim 1, wherein the communication system is a VoIP system.

17. The arrangement of claim 1, wherein the local wireless link comprises a Wi-Fi link.

18. The arrangement of claim 1, wherein the local wireless link comprises a Bluetooth link.

19. A mixer client application comprising code embodied on a computer-readable storage medium and configured so as when executed on a first terminal to:
- operate the first terminal to establish the call with a remote, third terminal using a packet-based communication system implemented over a wide-area packet-based communication network, based on a user credential identifying the mixer client as an endpoint of the call within the packet-based communication system from the perspective of the third terminal;
- simultaneously receive over a local wireless link a respective audio and/or video stream each associated with a different respective near-end user a plurality of second terminals coupled to the first terminal via a local wireless link, each from a respective instance of a lightweight sub-client running on a respective second terminal having reduced functionality relative to the mixer client;
- switch between a multi-terminal state of operation in which the call uses the streams received from the sub-clients and a same-terminal state of operation in which the call uses a stream generated by the first terminal without the streams from the sub-clients; and
- in said multi-terminal state of operation, mix the simultaneous streams received from the sub-clients at the first terminal, to encode the mixed stream at the first terminal, and transmit the mixed stream to the third terminal as part of said call over the packet-based communication system under identification by said user credential, wherein the reduced functionality of the sub-client comprises being configured only to communicate on the local wireless link and not using the packet-based communication system implemented over said packet-based communication network, and using only a reduced compression of the audio and/or video stream sent to the mixer client over the local link, relative to compression used by the mixer client to compress the mixed stream to the third terminal over the packet-based communication system.

20. A sub-client application for participating in a call via a first client on a first terminal but having reduced functionality relative to the first client, the sub-client comprising code embodied on a computer-readable storage medium and configured so as when executed on a second terminal to:
- generate a respective audio and/or video stream associated with a respective near-end user; and
- transmit the respective stream to the first client over a local wireless link, to be used in a call established by the first client with a remote, third terminal using a packet-based communication system implemented over a wide-area packet-based communication network based on a user credential identifying the first client as an endpoint of the call within the packet-based communication system from the perspective of the third terminal;

thereby participating in the call via the first client, in which the first client is enabled by said generation and transmission of said stream to switch between a second state of operation in which the call uses the one or more stream received from one or more sub-clients, including at least the stream from said sub client, and a first state of operation in which the call uses a stream generated by the first terminal without the streams from the sub-clients, wherein in said second state of operation the first client encodes the one or more streams from the one or more sub-clients into an encoded stream at the first terminal and transmits the encoded stream to the third terminal as part of said call over the packet-based communication system under identification by said user credential, wherein the reduced functionality of the sub-client comprises being configured only to communicate on the local wireless link and not using the packet-based communication system implemented over said packet-based communication network, and using only a reduced compression of the audio and/or video stream sent to the mixer client over the local link, relative to compression used by the mixer client to compress the mixed stream to the third terminal over the packet-based communication system.

* * * * *